(12) United States Patent
Huang et al.

(10) Patent No.: US 9,140,918 B2
(45) Date of Patent: Sep. 22, 2015

(54) STRUCTURE OF LIQUID CRYSTAL MODULE

(71) Applicant: Shenzhen China Star Optoelectronics Technology Co., Ltd., Shenzhen, Guangdong (CN)

(72) Inventors: Chong Huang, Shenzhen (CN); Yuchun Hsiao, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 168 days.

(21) Appl. No.: 13/981,687

(22) PCT Filed: Jun. 25, 2013

(86) PCT No.: PCT/CN2013/077937
§ 371 (c)(1),
(2) Date: Jul. 25, 2013

(87) PCT Pub. No.: WO2014/146368
PCT Pub. Date: Sep. 25, 2014

(65) Prior Publication Data
US 2014/0285746 A1    Sep. 25, 2014

(30) Foreign Application Priority Data

Mar. 20, 2013    (CN) .......................... 2013 1 0091467

(51) Int. Cl.
*G02F 1/1333* (2006.01)
*G02F 1/1335* (2006.01)

(52) U.S. Cl.
CPC .... *G02F 1/133308* (2013.01); *G02F 1/133512* (2013.01); *G02F 1/133608* (2013.01); *G02F 1/133611* (2013.01); *G02F 2001/133317* (2013.01); *G02F 2201/503* (2013.01)

(58) Field of Classification Search
CPC ................... G02F 1/133308; G02F 1/133608; G02F 1/133611; G02F 1/133615
USPC ...................................................... 349/58–69
See application file for complete search history.

(56) References Cited

U.S. PATENT DOCUMENTS

| | | | |
|---|---|---|---|
| 2011/0037920 A1 | 2/2011 | Kim et al. | |
| 2011/0134346 A1* | 6/2011 | Hayashi et al. | 348/790 |
| 2013/0077014 A1* | 3/2013 | Yang | 349/58 |
| 2013/0107157 A1* | 5/2013 | Yang et al. | 349/58 |

FOREIGN PATENT DOCUMENTS

| | | |
|---|---|---|
| CN | 101311788 A | 11/2008 |
| CN | 102352991 A | 2/2012 |
| CN | 103149717 A | 6/2013 |

* cited by examiner

*Primary Examiner* — Dung Nguyen
(74) *Attorney, Agent, or Firm* — Andrew C. Cheng

(57) ABSTRACT

The present invention provides a structure of a liquid crystal module, which includes a backlight module, a mold frame mounted on the backlight module, a liquid crystal display panel mounted on the mold frame, an adaptor mounted to the backlight module, and a bezel mounted on the adaptor. The adaptor includes a connection board and a positioning board perpendicularly connected to the connection board. The connection board is mounted to the backlight module. The liquid crystal display panel is positioned against the positioning board. The bezel is fixedly connected to the positioning board. Through the arrangement of the adaptor for positioning the liquid crystal display panel, the distance between an edge of an opening of the bezel that is mounted to the adaptor and an edge of a black matrix of the liquid crystal display panel can be kept constant.

17 Claims, 14 Drawing Sheets

STRUCTURE OF LIQUID CRYSTAL MODULE

BACKGROUND OF THE INVENTION

1. Field of the Invention

The present invention relates to the field of liquid crystal display, and more particular to a structure of a liquid crystal module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise an enclosure, a liquid crystal panel arranged in the enclosure, and a backlight module that is arranged in the enclosure. The operation principle of the liquid crystal panel is that with liquid crystal molecules being interposed between two parallel glass substrates, application of electricity is selectively carried out to control the liquid crystal molecules to change direction in order to refract out light emitting from the backlight module for generating images. Since the liquid crystal panel itself does not emit light, light must be provided by the backlight module in order to normally display images. Thus, the backlight module is one of the key components of an LCD. The backlight module can be classified in two types, namely a side-edge backlight module and a direct backlight module, according to the position where light gets incident. The direct backlight module comprises a light source, such as a cold cathode fluorescent lamp (CCFL) or a light-emitting diode (LED), which is arranged at the backside of the liquid crystal panel to form a planar light source that directly provides lighting to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly to form a planar light source for the liquid crystal panel.

Referring to FIG. 1, a liquid crystal display module generally comprises a backlight module 100, a mold frame 300 arranged on the backlight module 100, a liquid crystal display panel 500 arranged on the mold frame 300, and a bezel 700 arranged on the liquid crystal display panel 500. The backlight module 100 comprises: a backplane 110, a backlight source 130 arranged in the backplane 110, a reflector plate 150 arranged in the backplane 110, a light guide plate 170 arranged on the reflector plate 150, and an optic film assembly 190 arranged on the light guide plate 170. The mold frame 300 carries and supports the liquid crystal display panel 500. The bezel 700 is secured to the backplane 110 of the backlight module 100 to form a liquid crystal display device. The liquid crystal display panel 500 that is conventionally used (as shown in FIG. 2) comprises a thin-film transistor (TFT) substrate 502, a color filter (CF) substrate 504 that is arranged opposite to and bonded the TFT substrate 502, and liquid crystal (not shown) arranged between the TFT substrate 502 and the CF substrate 504. A black matrix (BM) 508 is arranged along an outer circumference of a displaying zone of the TFT substrate 502. In assembling a liquid crystal display with the conventionally known structure of the liquid crystal module, the liquid crystal display panel 500 is assembled to the backlight module 100 (as shown in FIG. 3). Due to the factor of assembling tolerance, the liquid crystal display panel 500 may be shifted leftward or rightward, or upward or downward, with respect to the backlight module 100. After the bezel 700 is set, the width of the portion of the black matrix 508 of the liquid crystal display panel 500 that is exposed in the opening of the bezel 700 may be inconsistent due to the liquid crystal display panel 500 being shifted, causing an influence on the performance of the displaying zone of the liquid crystal display device.

SUMMARY OF THE INVENTION

An object of the present invention is to provide a structure of a liquid crystal module that comprises an adaptor mounted on a bezel to properly position a liquid crystal display panel so that the width dimension of the portion of a black matrix that is exposed in an opening of the bezel of the liquid crystal display is kept constant in order to ensure the performance of the displaying zone of the liquid crystal display panel.

To achieve the above object, the present invention provides a structure of a liquid crystal module, which comprises: a backlight module, a mold frame mounted on the backlight module, a liquid crystal display panel mounted on the mold frame, an adaptor mounted to the backlight module, and a bezel mounted on the adaptor. The adaptor comprises a connection board and a positioning board perpendicularly connected to the connection board. The connection board is mounted to the backlight module. The liquid crystal display panel is positioned against the positioning board. The bezel is fixedly connected to the positioning board.

The positioning board comprises a cushion at a location corresponding to the liquid crystal display panel. The liquid crystal display panel is positioned against the cushion.

The cushion comprises a rubber material, a silicone rubber material, or a foamed material.

A plurality of reinforcement ribs is provided at connection between the connection board and the positioning board. The connection board, the positioning board, and the reinforcement ribs are integrally formed together with galvanized steel plate.

The backlight module comprises a backplane. The backplane comprises a bottom board and a plurality of first side boards perpendicularly connected to the bottom board.

The connection board is mounted to the bottom board.

The connection board comprises a plurality of elongated positioning holes and a plurality of elongated locking holes. The bottom board comprises cylindrical positioning pegs corresponding to the elongated positioning holes and circular locking holes corresponding to the elongated locking holes. First bolts are received from underside of the connection board through the elongated locking holes to engage and be fixed in the circular locking holes so as to connect the connection board and the bottom board.

The bezel comprises a bezel body and a plurality of second side boards perpendicularly connected to the bezel body. At least one of the second side boards is arranged to correspond to the positioning board. The bezel is connected via the second side board to the positioning board.

The positioning board comprises a threaded hole formed therein. The second side board that is mounted to the positioning board comprises a first apertures corresponding to the threaded hole. A second bolt is received from an outside of the second side board through the first aperture to be fixed to the threaded hole, so as to fixedly connect the second side board to the positioning board.

The mold frame comprises a support section and a plurality of mounting sections perpendicularly connected to the support section. The support section supports the liquid crystal display panel. The mounting sections comprise a second hole corresponding to the threaded hole.

The backlight module comprises a light guide plate mounted in the backplane, a reflector plate mounted between the light guide plate and the backplane, an optic film assembly mounted above the light guide plate, and a backlight source mounted to the backplane. The light guide plate is arranged on the bottom board. The reflector plate is arranged between the light guide plate and the bottom board. The backlight source is mounted to the first side boards.

The present invention further provides a structure of a liquid crystal module, which comprises: a backlight module, a mold frame mounted on the backlight module, a liquid crystal display panel mounted on the mold frame, an adaptor mounted to the backlight module, and a bezel mounted on the adaptor, the adaptor comprising a connection board and a positioning board perpendicularly connected to the connection board, the connection board being mounted to the backlight module, the liquid crystal display panel being positioned against the positioning board, the bezel being fixedly connected to the positioning board;

wherein the positioning board comprises a cushion at a location corresponding to the liquid crystal display panel, the liquid crystal display panel being positioned against the cushion;

wherein the cushion comprises a rubber material, a silicone rubber material, or a foamed material;

wherein a plurality of reinforcement ribs is provided at connection between the connection board and the positioning board, the connection board, the positioning board, and the reinforcement ribs being integrally formed together with galvanized steel plate;

wherein the backlight module comprises a backplane, the backplane comprising a bottom board and a plurality of first side boards perpendicularly connected to the bottom board;

wherein the connection board is mounted to the bottom board;

wherein the connection board comprises a plurality of elongated positioning holes and a plurality of elongated locking holes, the bottom board comprising cylindrical positioning pegs corresponding to the elongated positioning holes and circular locking holes corresponding to the elongated locking holes, first bolts being received from underside of the connection board through the elongated locking holes to engage and be fixed in the circular locking holes so as to connect the connection board and the bottom board;

wherein the bezel comprises a bezel body and a plurality of second side boards perpendicularly connected to the bezel body, at least one of the second side boards being arranged to correspond to the positioning board, the bezel being connected via the second side board to the positioning board;

wherein the positioning board comprises a threaded hole formed therein, the second side board that is mounted to the positioning board comprising a first apertures corresponding to the threaded hole, a second bolt being received from an outside of the second side board through the first aperture to be fixed to the threaded hole, so as to fixedly connect the second side board to the positioning board;

wherein the mold frame comprises a support section and a plurality of mounting sections perpendicularly connected to the support section, the support section supporting the liquid crystal display panel, the mounting sections comprising a second hole corresponding to the threaded hole; and wherein the backlight module comprises a light guide plate mounted in the backplane, a reflector plate mounted between the light guide plate and the backplane, an optic film assembly mounted above the light guide plate, and a backlight source mounted to the backplane, the light guide plate being arranged on the bottom board, the reflector plate being arranged between the light guide plate and the bottom board, the backlight source being mounted to the first side boards.

The efficacy of the present invention is that the present invention provides a structure of a liquid crystal module, which, through the arrangement of an adaptor for positioning a liquid crystal display panel, makes the distance between an edge of an opening of a bezel that is mounted to the adaptor and an edge of a black matrix of the liquid crystal display panel constant so as to ensure the consistence of the width of an exposed portion of the black matrix in assembling the liquid crystal panel and prevent the situation of irregular black perimeter around a displaying zone of the liquid crystal display panel resulting from inconsistent exposed width of the black matrix caused by assembling tolerances of the liquid crystal display panel in a conventional liquid crystal display device, thereby ensuring the displaying performance of the displaying zone of the liquid crystal display panel.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

Figure 1:
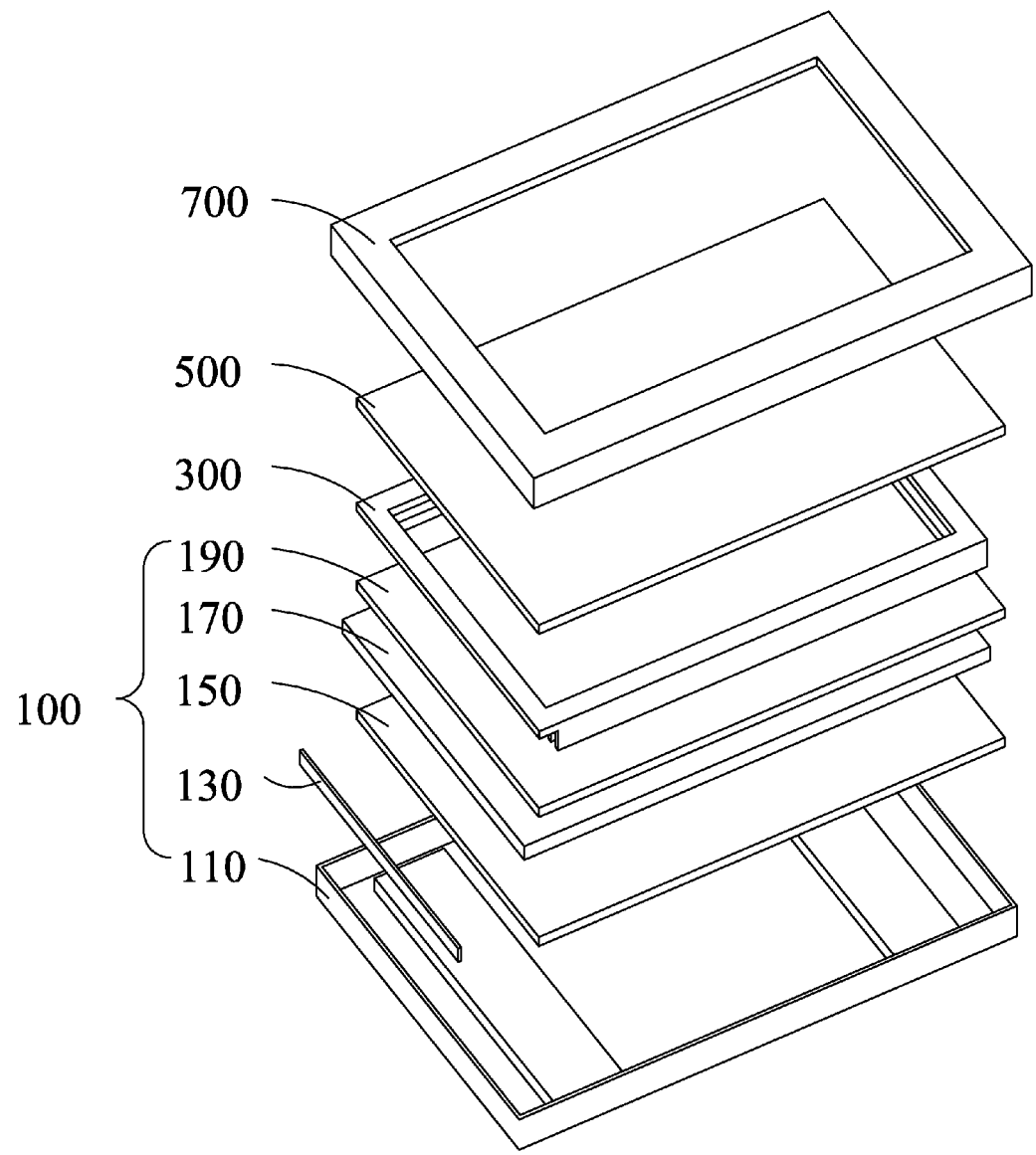
FIG. 1 is an exploded view showing a conventional liquid crystal display device.
Figure 2:
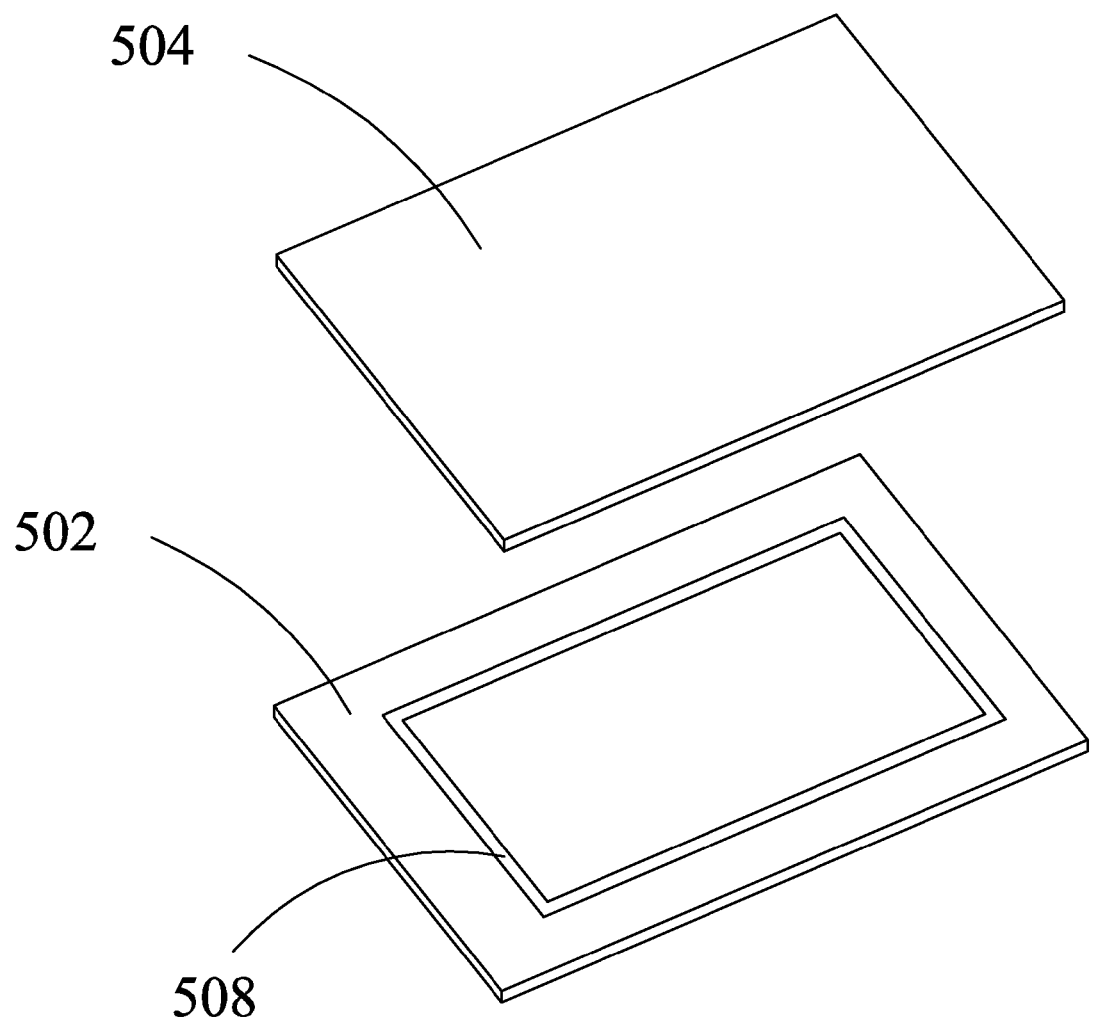
FIGS. 2 is an exploded view showing a conventional liquid crystal display panel.
Figure 3:
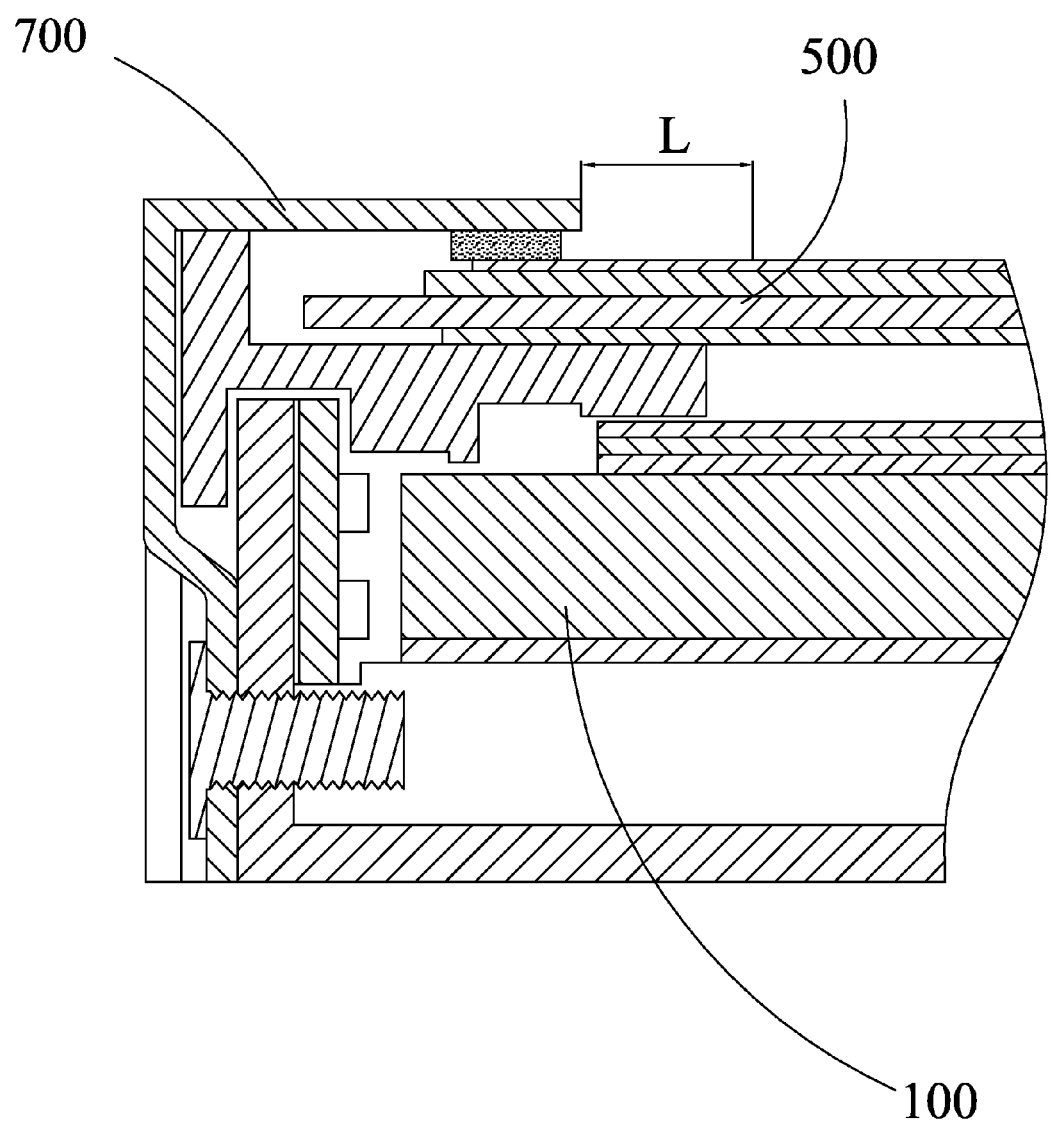
FIG. 3 is a partial cross-sectional view showing a structure of a conventional liquid crystal module.
Figure 4:
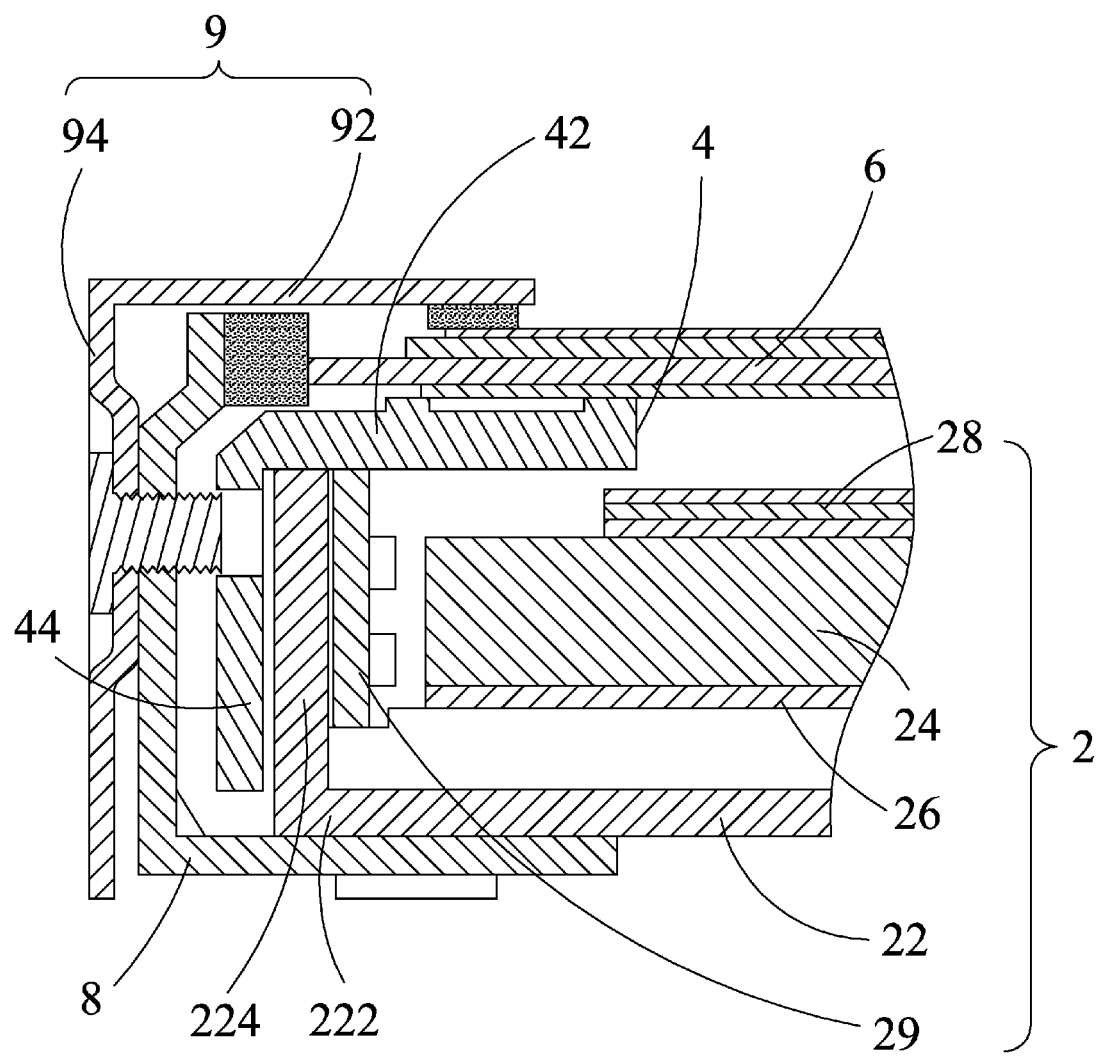
FIG. 4 is a partial cross-sectional view showing a structure of a liquid crystal module according to a first embodiment of the present invention.
Figure 5:
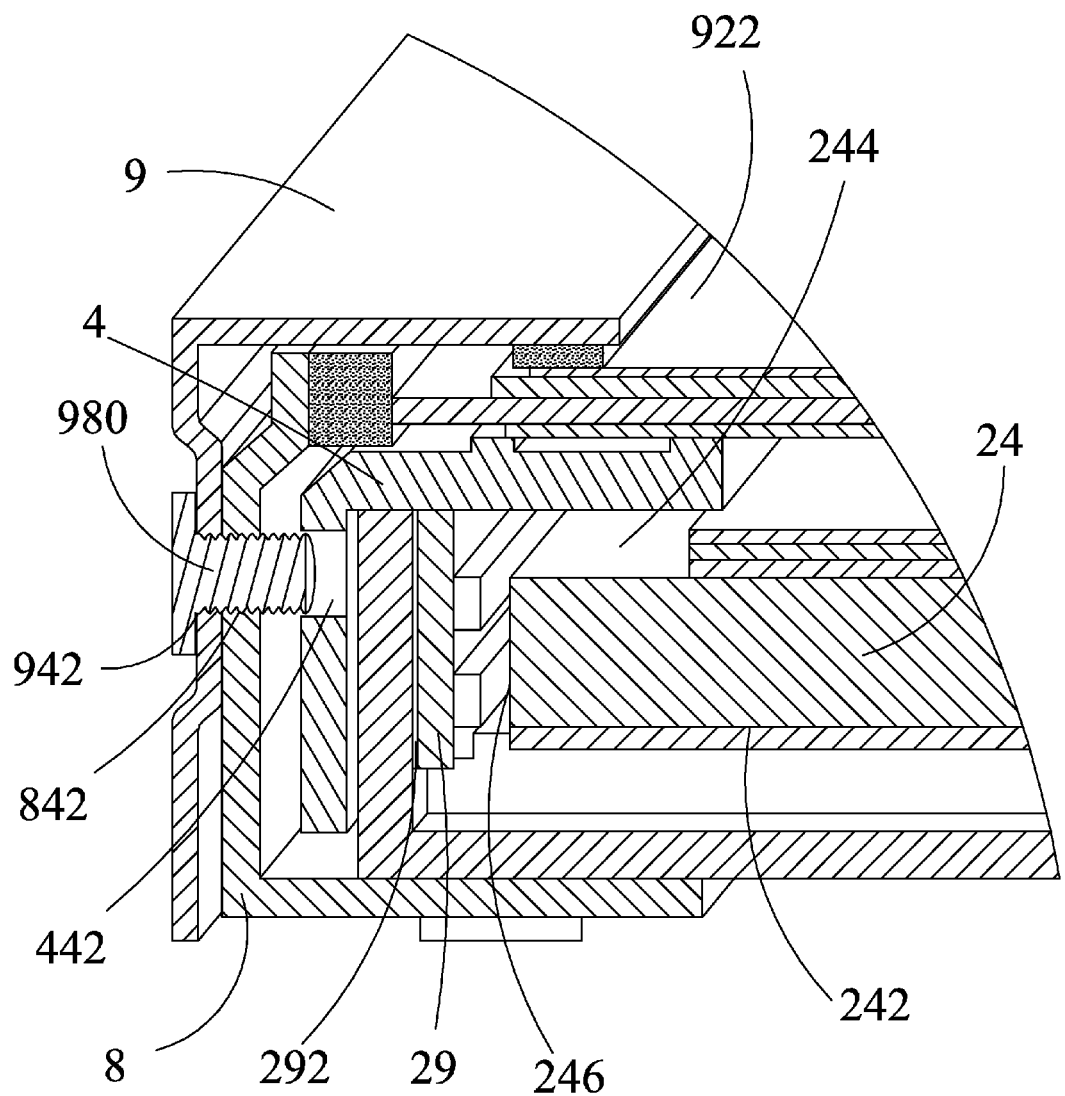
FIG. 5 is a perspective view of the structure of FIG. 4.
Figure 6:
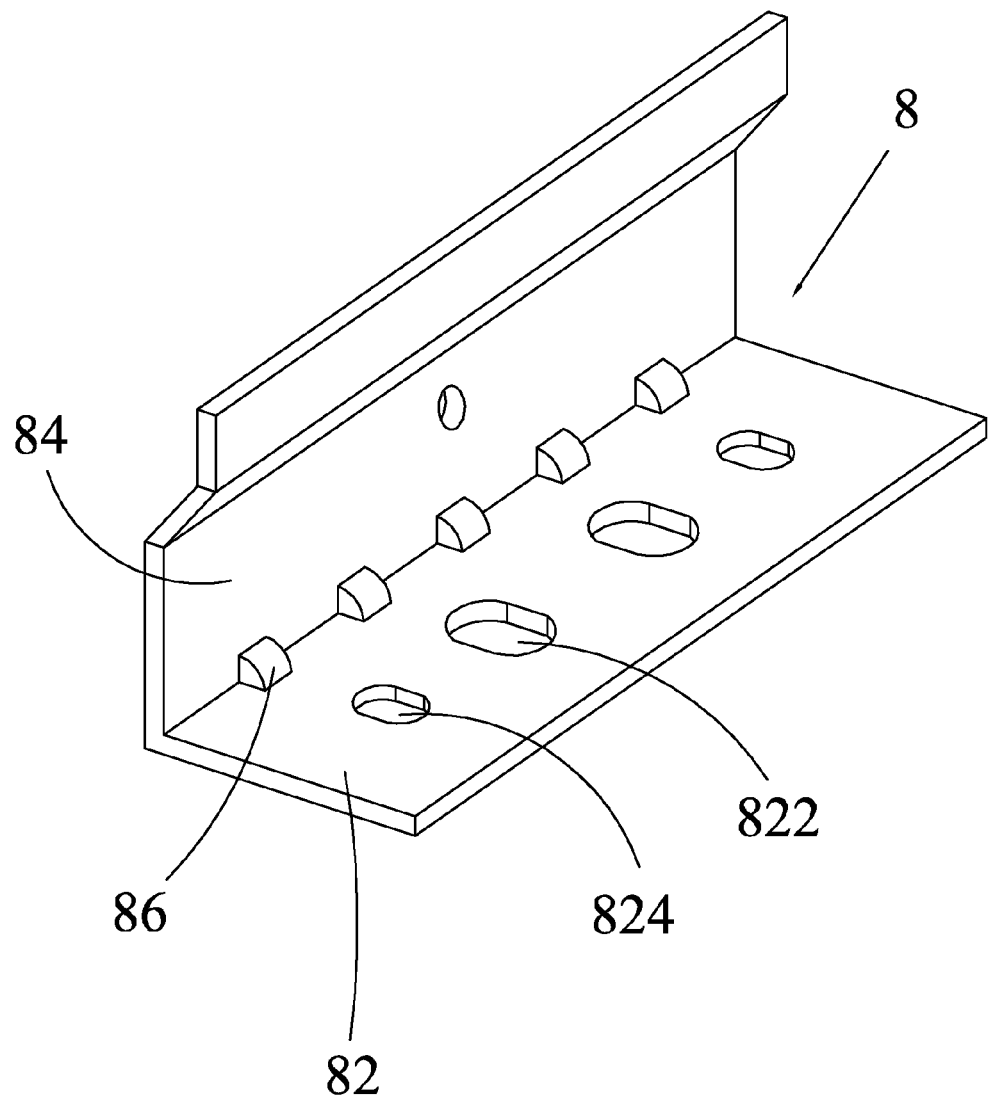
FIG. 6 is a perspective view showing an adaptor of the structure of the liquid crystal module according to the first embodiment of the present invention.
Figure 7:
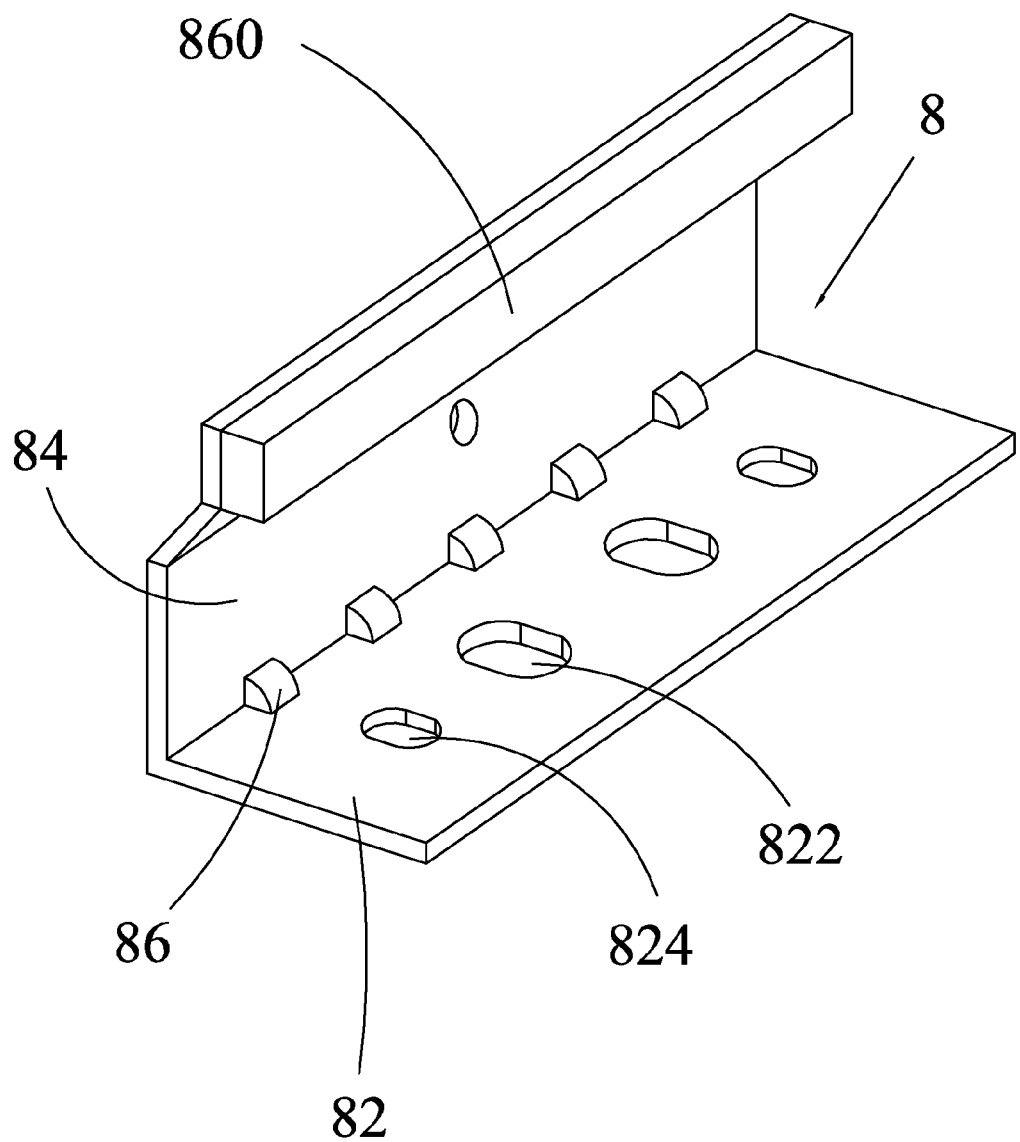
FIG. 7 is a perspective view showing the adaptor and a cushion assembled together for the structure of the liquid crystal module according to the first embodiment of the present invention.
Figure 8:
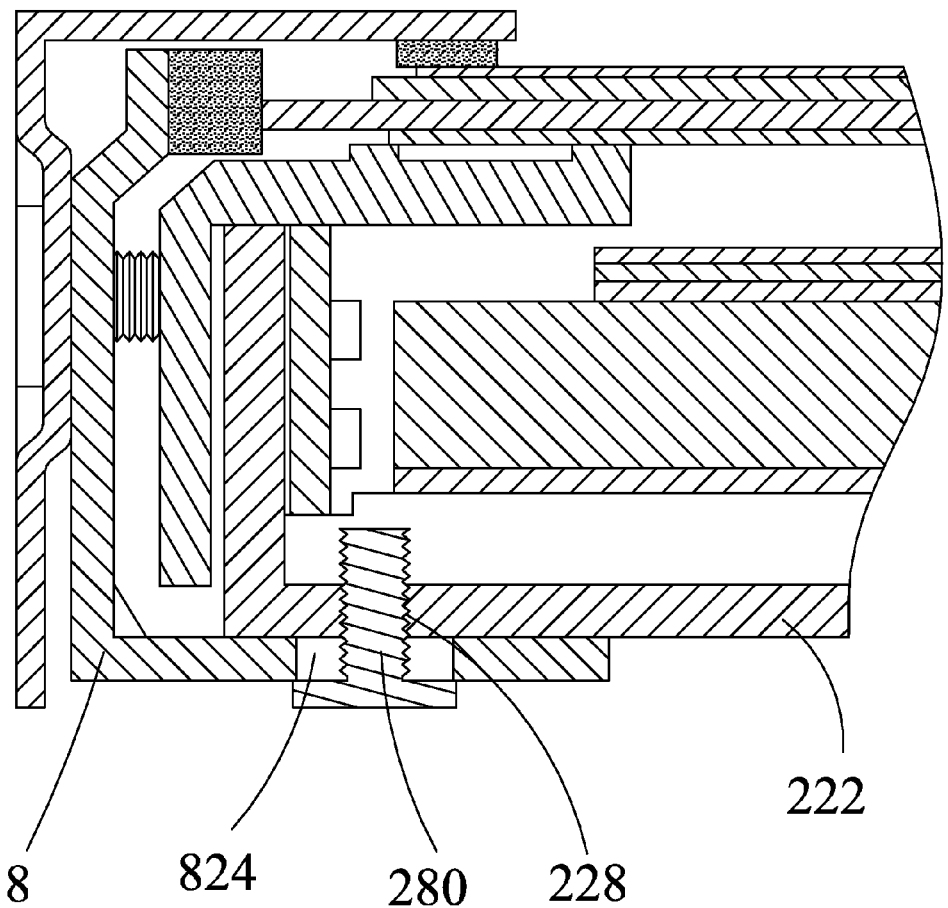
FIG. 8 is another partial cross-sectional view showing the structure of the liquid crystal module according to the first embodiment of the present invention.
Figure 9:
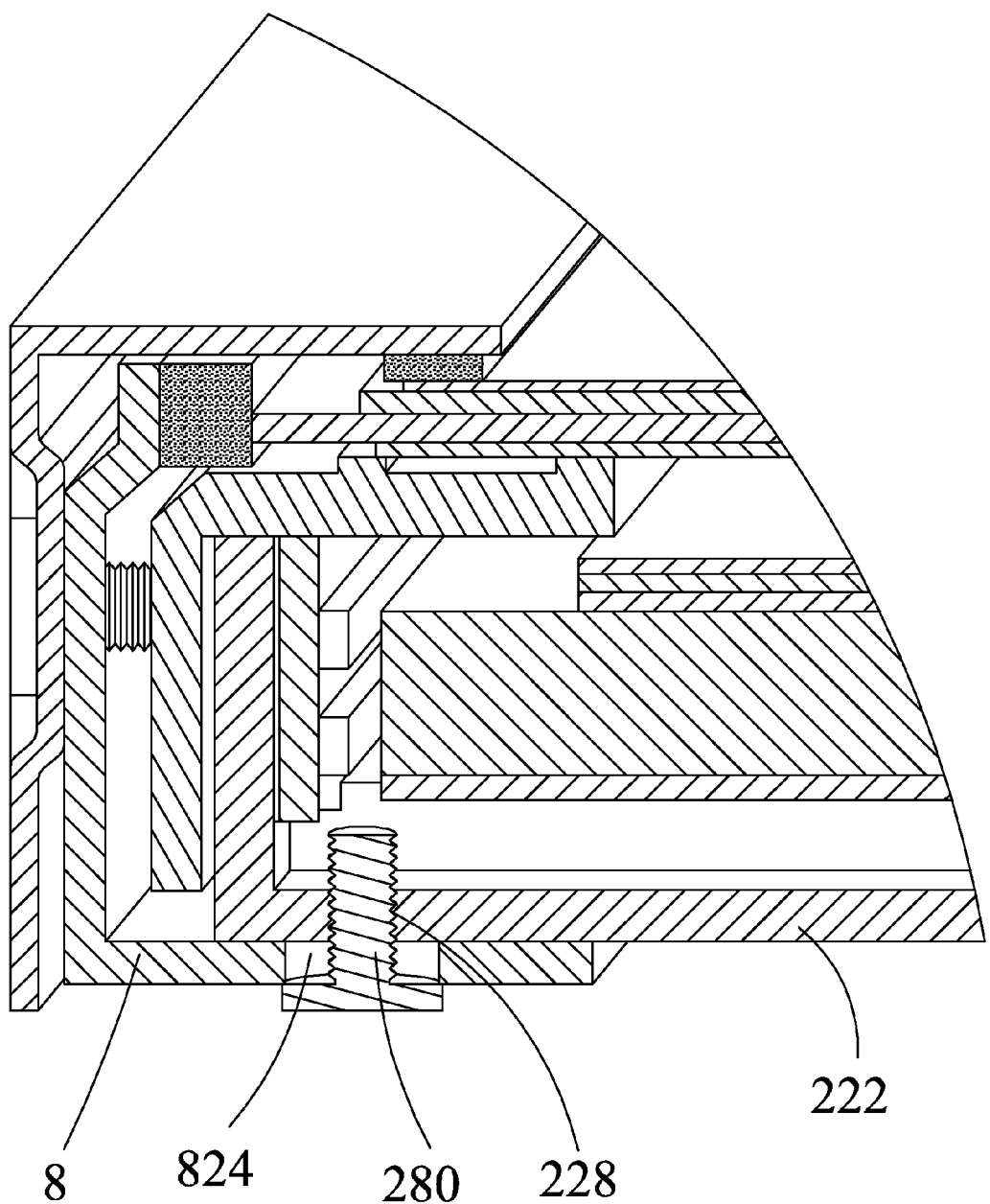
FIG. 9 is a perspective view of the structure of FIG. 8.
Figure 10:
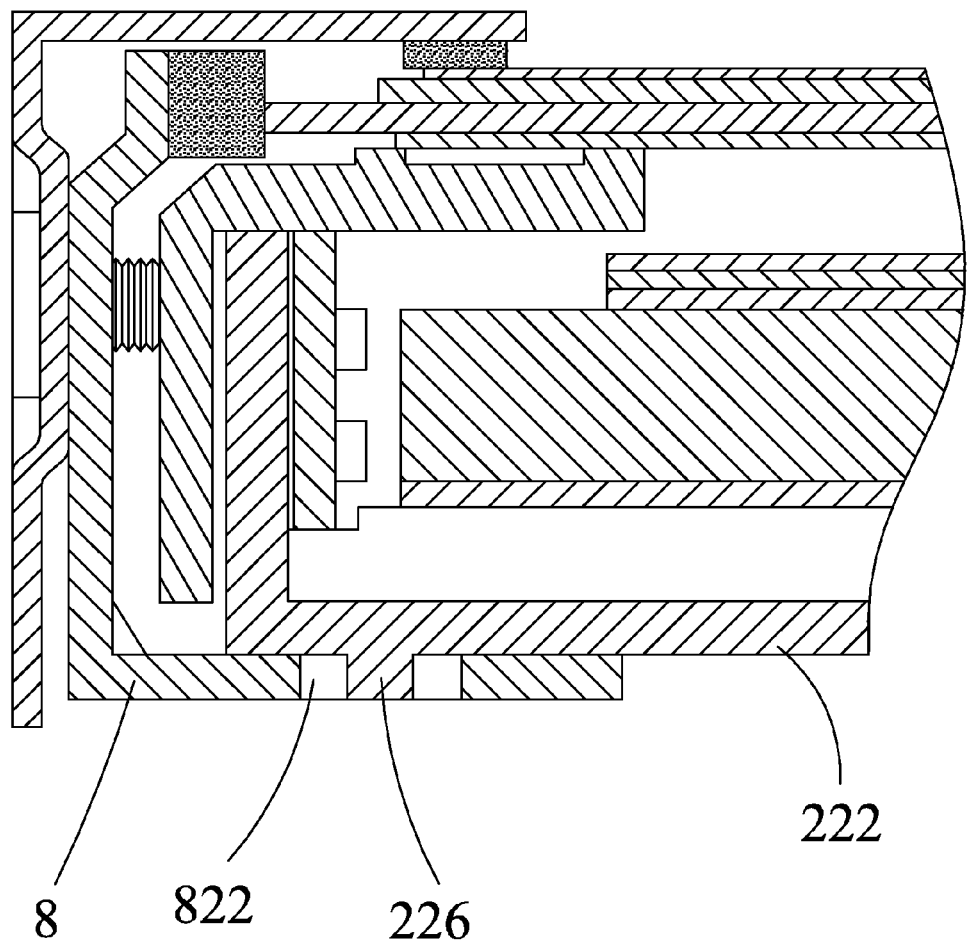
FIG. 10 is a further partial cross-sectional view showing the structure of the liquid crystal module according to the first embodiment of the present invention.
Figure 11:
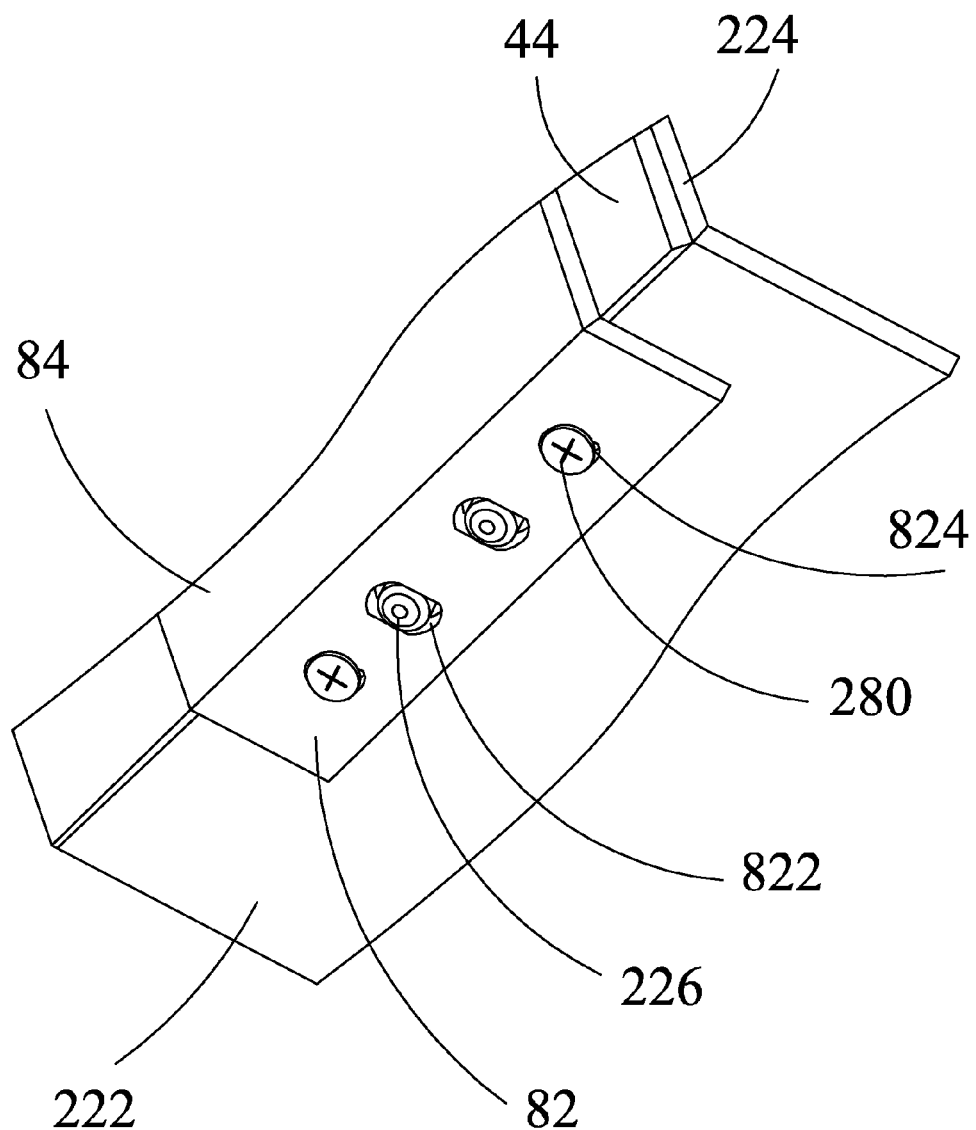
FIG. 11 is a perspective view showing the adaptor and a backplane assembled together for the liquid crystal module according to the first embodiment of the present invention.
Figure 12:
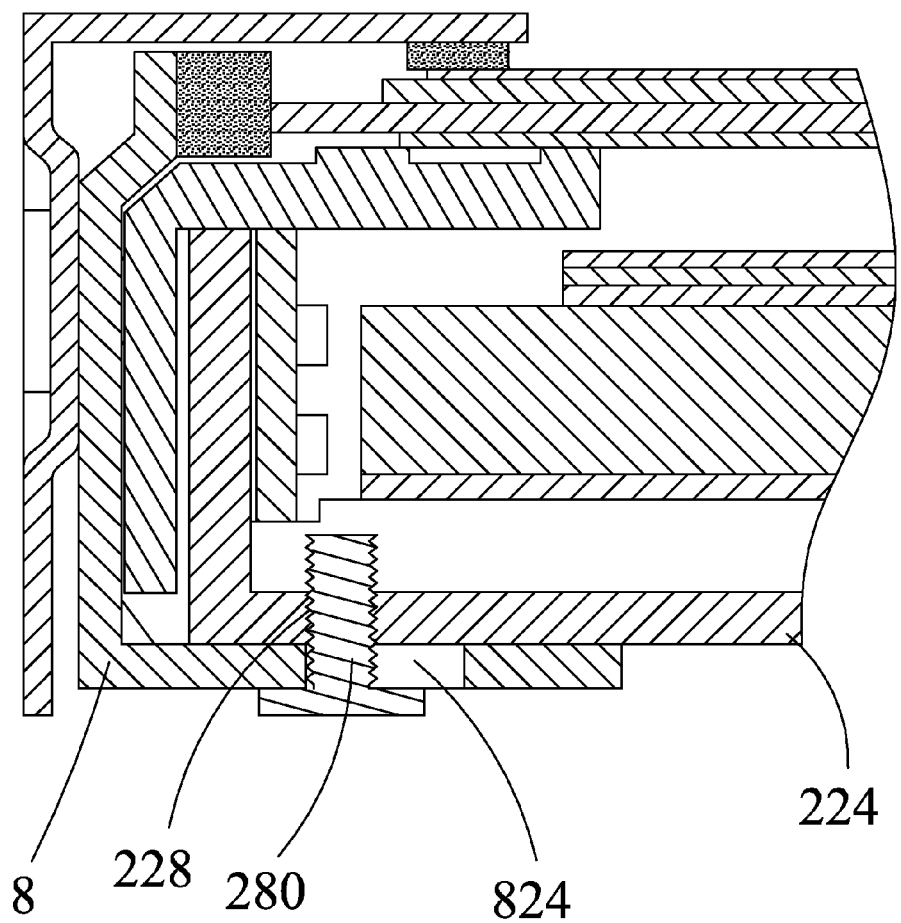
FIG. 12 is a cross-sectional view showing the adaptor of the structure of the liquid crystal module according to the first embodiment of the present invention being rightward adjusted.
Figure 13:
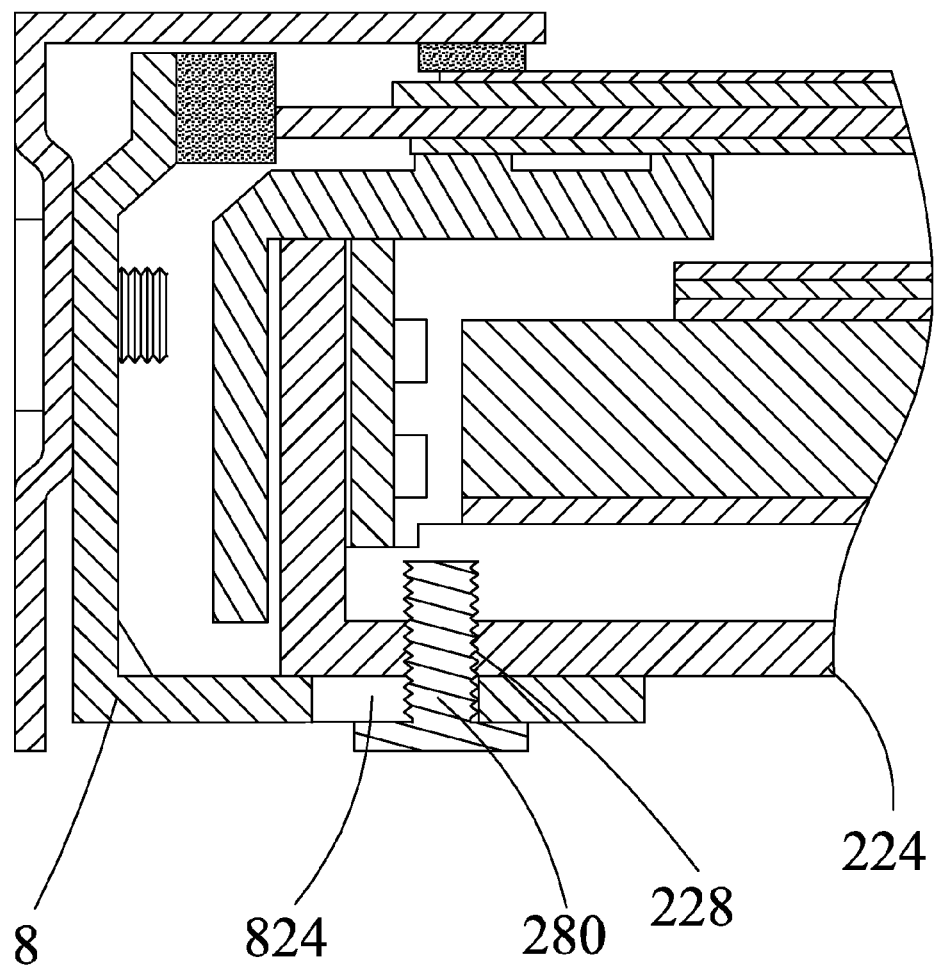
FIG. 13 is a cross-sectional view showing the adaptor of the structure of the liquid crystal module according to the first embodiment of the present invention being leftward adjusted.

To further expound the technical solution adopted in the present invention and the advantages thereof, a detailed description is given to a preferred embodiment of the present invention and the attached drawings.

Referring to FIGS. 4-13, the present invention provides a structure of a liquid crystal module, which comprises: a backlight module 2, a mold frame 4 mounted on the backlight module 2, a liquid crystal display panel 6 mounted on the mold frame 4, an adaptor 8 mounted to the backlight module 2, and a bezel 9 mounted on the adaptor 8.

The backlight module 2 comprises a backplane 22, a light guide plate 24 mounted in the backplane 22, a reflector plate 26 mounted between the light guide plate 24 and the backplane 22, an optic film assembly 28 mounted above the light guide plate 24, and a backlight source 29 mounted to the backplane 22.

The backplane 22 comprises a bottom board 222 and a plurality of first side boards 224 perpendicularly connected to the bottom board 222. The light guide plate 24 is arranged on the bottom board 222. The light guide plate 24 comprises a bottom face 242 that faces the bottom board 222, a top face 244 distant from the bottom board 222, and a plurality of side faces arranged between the top face 244 and the bottom face 242. The plurality of side faces comprises at least a light incidence face 246. The reflector plate 26 is arranged between the bottom face 242 of the light guide plate 24 and the bottom board 222 of the backplane 22. The backlight source 29 is mounted to the first side board 224 of the backplane 22 that corresponds to the light incidence face 246 of the light guide plate 24. Light emitting from the backlight source 29 directly enters the light guide plate 24 by passing through the light incidence face 246 of the light guide plate 24 or is first reflected by the reflector plate 26 to then enter the light guide plate 24 through the bottom face 242, and is transmitted through the light guide plate 24 to be projected out through the top face 244 of the light guide plate 24 to pass through the optic film assembly 28 for providing a planar light source having uniform illumination to the liquid crystal display panel 6.

In the instant embodiment, the bottom board 222 and the first side boards 224 of the backplane 22 are integrally formed with a metal material. The metal material is preferably an aluminum alloy in order to increase thermal conductivity of the backplane 22 as much as possible while maintaining the strength of the backplane 22. A thermally conductive material 292 is arranged between the backlight source 29 and the first side board 224 of the backplane 22 to allow effective transmission of the thermal energy generated by the backlight source 29 to the backplane 22 to be then subjected to heat exchange with the surroundings through the backplane 22 so as lower down the temperature of the backlight module 2. In the instant embodiment, the thermally conductive material 292 comprises a thermal grease, which, while conducting heat, bonds and fixes the backlight source 29 to the first side boards 224 of the backplane 22.

The mold frame 4 comprises a support section 42 and a plurality of mounting sections 44 perpendicularly connected to the support section 42. The support section 42 supports and provides cushioning to the liquid crystal display panel 6. The mold frame 4 is mounted on the backplane 22. The support section 42 is positioned and supported on the end of the first side board 224 of the backplane 22 that is distant from the bottom board 222. The mounting sections 44 are set outside and around the first side boards 224 of the backplane 22.

The adaptor 8 is made of a metal material and is preferably formed by stamping a galvanized steel plate and comprises a connection board 82 and a positioning board 84 perpendicularly connected to the connection board 82. The connection board 82 is mounted to the backlight module 2. The liquid crystal display panel 6 is positioned against the positioning board 84. The number and locations of the adaptor 8 can be determined according to the requirement for positioning of the liquid crystal display panel 6. Preferably, an adaptor 8 is provided at each of two adjacent sides of the liquid crystal display panel 6, whereby the positioning of the liquid crystal display panel 8 can be more precisely so as to ensure improved consistency of the width of the black matrix exposed outside the bezel 9 after the bezel 9 is assembled.

Specifically, the connection board 82 comprises a plurality of elongated positioning holes 822 and a plurality of elongated locking holes 824. The elongated positioning holes 822 and the elongated locking holes 824 are arranged to have lengthwise directions thereof identical to each other and both perpendicular to the connection board 82. The bottom board 222 of the backplane 22 comprises cylindrical positioning pegs 226 corresponding to the elongated positioning holes 822 and circular locking holes 228 corresponding to the elongated locking holes 824. Preferably, the elongated positioning holes 822 and the elongated locking holes 824 are each of a number of two and correspondingly, the cylindrical positioning pegs 226 and the circular locking holes 228 are also each of a number of two. The two elongated positioning holes 822 are arranged next to each other, while the two elongated locking holes 824 are located on two opposite sides of the two elongated positioning holes 822 in order to prevent the connection board 82 of the adaptor 8 from rotating with respect to the bottom board 222 of the backplane 22 when the connection board 82 is secured to the bottom board 222 to result in assembling errors.

In mounting the adaptor 8 to the backplane 22 of the backlight module 2, the elongated positioning holes 822 are first fit over the cylindrical positioning pegs 226 and then first bolts 280 secures the connection board 82 and the bottom board 222 to each other by extending through the elongated locking holes 824 and the circular locking holes 228. Before the bolts 280 are tightened, the first bolts 280 and the cylindrical positioning pegs 226 are allowed to respectively slide within the elongated locking holes 824 and the elongated positioning holes 822 so that the location of the adaptor 8 can be adjusted according to the location of the liquid crystal display panel 6 to have the liquid crystal display panel 6 tightly abutting the positioning board 84 of the adaptor 8, thereby allowing the adaptor 8 to properly position the liquid crystal display panel 6.

The bezel 9 is fixedly connected to the positioning board 84 of the adaptor 8. The bezel 9 comprises a bezel body 92 and a plurality of second side boards 94 perpendicularly connected to the bezel body 92. The bezel body 92 functions to fix the liquid crystal display panel 6 in the mold frame 4 and displays a displaying zone of the liquid crystal display panel 6 through an opening 922 of the bezel body 92. At least one of the second side boards 94 is arranged to correspond to the positioning board 84 of the adaptor 8 and is secured to the outside surface of the positioning board 84 of the adaptor 8 by a second bolt 980.

Specifically, the positioning board 84 comprises a threaded hole 842 and the second side board 94 that is mounted to the positioning board 84 comprises a first aperture 942 corresponding to the threaded hole 842. The second bolts 980 is received, from the outside of the second side board 94, through the first aperture 942 to engage and be fixed in the threaded hole 842 so as to fixedly connect the second side board 94 to the positioning board 84.

Preferably, for making the bezel slim, the positioning board 84 can be designed to be thin. However, when the thickness of the positioning board 84 is smaller than 0.8 t, the threaded hole 842 can be formed through first drawing and then tapping in order to prevent stripping when the second bolt 980 secures the bezel 9 and the adaptor 8.

Further, to realize bezel slimming, the mounting section 44 of the mold frame 4 that corresponds to the positioning board 84 is provided with a second hole 442 corresponding to the threaded hole 842 in order to avoid interference caused by excessive length of the second bolt 980.

To well protect the liquid crystal display panel 6, the positioning board 84 comprises a cushion 860 at a location corresponding to the liquid crystal display panel 6. The cushion 860 is made of a rubber material, a silicone rubber material, or a foamed material. The liquid crystal display panel 6 is positioned against the cushion 860, whereby the cushion 860 may provide effective cushioning to the liquid crystal display panel 6 for protecting the liquid crystal display panel 6 from being damaged by external forces.

To ensure the verticality between the connection board 82 and the positioning board 84, connection between the connection board 82 and the positioning board 84 is provided with a plurality of reinforcement ribs 86. The connection board 82, the positioning board 84, and the reinforcement ribs 86 are integrally formed together with galvanizing steel plate.

The specific way of assembling a liquid crystal display device that includes the structure of the liquid crystal module according to the present invention is as follows: Firstly, the mold frame 4 is set on the backlight module 2 and the adaptor 8 is mounted to the backlight module 2. The first bolt 280 is not secured at this moment. Next, the liquid crystal display panel 6 is assembled in the mold frame 4 and the positioning board 84 of the adaptor 8 and the liquid crystal display panel 6 are put against each other. The first bolt 280 is tightened. The bezel 9 is set on the liquid crystal display panel 6 and the bezel 9 is secured to the adaptor 8. During the process of assembling the liquid crystal display panel 6, the positioning board 84 of the adaptor 8 is kept in contact with the liquid crystal display panel 6 so that after the assembling, the distance between an edge of the opening 922 of the bezel body 92 of the bezel 9 and an edge of the black matrix of the liquid crystal display panel 6 may be kept constant thereby ensuring the displaying performance of the displaying zone of the liquid crystal display panel 6.

Figure 14:
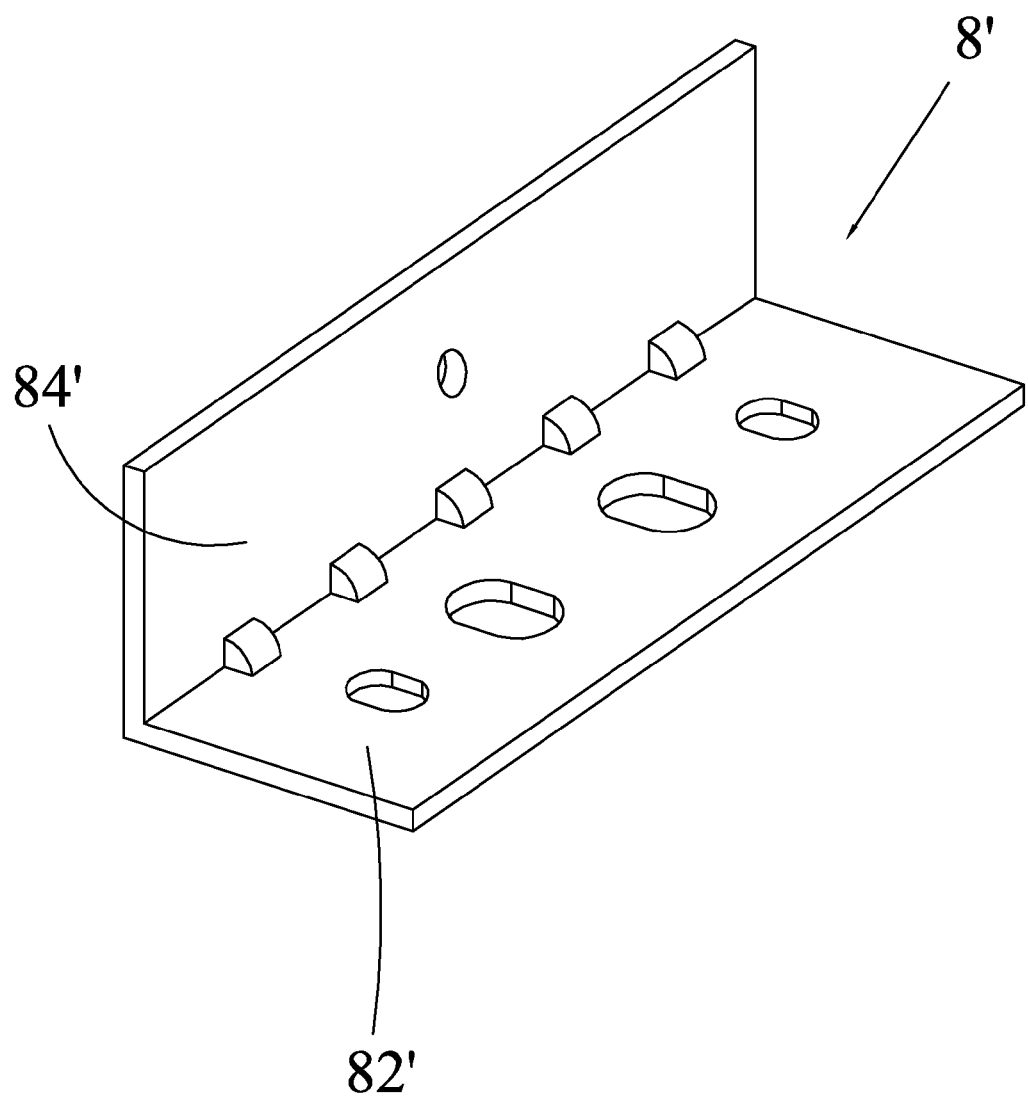
FIG. 14 is a perspective view showing an adaptor of a structure of a liquid crystal module according to a second embodiment of the present invention.

It is noted here that the specific shape of the adaptor of the structure of the liquid crystal module according to the present invention can be modified according to what is needed. For example, as shown in the perspective view of the adaptor according to the first embodiment shown in FIG. 5, in the instant embodiment, the positioning section 84 of the adaptor 8 that is positioned against the liquid crystal display panel 6 is made in a curved form. And, as shown in the perspective view of an adaptor according to a second embodiment of the present invention shown in FIG. 14, in the second embodiment, the positioning section 84' of the adaptor 8' that is positioned against the liquid crystal display panel 6 is made in a vertical straight form. Both arrangements equally accomplish the technical effectiveness of the present invention, but the structure of the adaptor according to the present invention is not limited these two arrangements.

In summary, the present invention provides a structure of a liquid crystal module, which, through the arrangement of an adaptor for positioning a liquid crystal display panel, makes the distance between an edge of an opening of a bezel that is mounted to the adaptor and an edge of a black matrix of the liquid crystal display panel constant so as to ensure the consistence of the width of an exposed portion of the black matrix in assembling the liquid crystal panel and prevent the situation of irregular black perimeter around a displaying zone of the liquid crystal display panel resulting from inconsistent exposed width of the black matrix caused by assembling tolerances of the liquid crystal display panel in a conventional liquid crystal display device, thereby ensuring the displaying performance of the displaying zone of the liquid crystal display panel.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A structure of a liquid crystal module, comprising: a backlight module, a mold frame mounted on the backlight module, a liquid crystal display panel mounted on the mold frame, an adaptor mounted to the backlight module, and a bezel mounted on the adaptor, the adaptor comprising a connection board and a positioning board perpendicularly connected to the connection board, the connection board being mounted to the backlight module, the liquid crystal display panel being positioned against the positioning board, the bezel being fixedly connected to the positioning board;

wherein the backlight module comprises a backplane, which comprises a bottom board and a plurality of first side boards perpendicularly connected to the bottom board;

wherein the connection board is mounted to the bottom board; and wherein the connection board comprises a plurality of elongated positioning holes and a plurality of elongated locking holes, the bottom board comprising cylindrical positioning pegs corresponding to the elongated positioning holes and circular locking holes corresponding elongated locking holes, first bolts being received from underside of the connection board through the elongated locking holes to engage and be fixed in the circular locking holes so as to connect the connection board and the bottom board.

2. The structure of the liquid crystal module as claimed in claim 1, wherein the positioning board comprises a cushion at a location corresponding to the liquid crystal display panel, the liquid crystal display panel being positioned against the cushion.

3. The structure of the liquid crystal module as claimed in claim 2, wherein the cushion comprises a rubber material, a silicone rubber material or a foamed material.

4. The structure of the liquid crystal module as claimed in claim 1, wherein a plurality of reinforcement ribs is provided at connection between the connection board and the positioning board, the connection board, the positioning board, and the reinforcement ribs being integrally formed together with galvanized steel plate.

5. The structure of the liquid crystal module as claimed in claim 1, wherein the bezel comprises a bezel body and a plurality of second side boards perpendicularly connected to the bezel body, at least one of the second side boards being arranged to correspond to the positioning board, the bezel being connected via the second side board to the positioning board.

6. The structure of the liquid crystal module as claimed in claim 5, wherein the positioning board comprises a threaded hole formed therein, the second side board that is mounted to the positioning board comprising a first apertures corresponding to the threaded hole, a second bolt being received from an outside of the second side board through the first aperture to be fixed to the threaded hole, so as to fixedly connect the second side board to the positioning board.

7. The structure of the liquid crystal module as claimed in claim 6, wherein the mold frame comprises a support section and a plurality of mounting sections perpendicularly connected to the support section, the support section supporting the liquid crystal display panel, the mounting sections comprising a second hole corresponding to the threaded hole.

8. The structure of the liquid crystal module as claimed in claim 1, wherein the backlight module comprises a light guide plate mounted in the backplane, a reflector plate mounted between the light guide plate and the backplane, an optic film assembly mounted above the light guide plate, and a backlight source mounted to the backplane, the light guide plate being arranged on the bottom board, the reflector plate being arranged between the light guide plate and the bottom board, the backlight source being mounted to the first side boards.

9. A structure of a liquid crystal module, comprising: a backlight module, a mold frame mounted on the backlight module, a liquid crystal display panel mounted on the mold frame, an adaptor mounted to the backlight module, and a bezel mounted on the adaptor, the adaptor comprising a connection board and a positioning board perpendicularly connected to the connection board, the connection board being mounted to the backlight module, the liquid crystal display panel being positioned against the positioning board, the bezel being fixedly connected to the positioning board;
  wherein the positioning board comprises a cushion at a location corresponding to the liquid crystal display panel, the liquid crystal display panel being positioned against the cushion;
  wherein the cushion comprises a rubber material or a silicone rubber material or a foamed material;
  wherein a plurality of reinforcement ribs is provided at connection between the connection board and the positioning board, the connection board, the positioning board, and the reinforcement ribs being integrally formed together with galvanized steel plate;
  wherein the backlight module comprises a backplane, the backplane comprising a bottom board and a plurality of first side boards perpendicularly connected to the bottom board;
  wherein the connection board is mounted to the bottom board;
  wherein the connection board comprises a plurality of elongated positioning holes and a plurality of elongated locking holes, the bottom board comprising cylindrical positioning pegs corresponding to the elongated positioning holes and circular locking holes corresponding to the elongated locking holes, first bolts being received from underside of the connection board through the elongated locking holes to engage and be fixed in the circular locking holes so as to connect the connection board and the bottom board;
  wherein the bezel comprises a bezel body and a plurality of second side boards perpendicularly connected to the bezel body, at least one of the second side boards being arranged to correspond to the positioning board, the bezel being connected via the second side board to the positioning board;
  wherein the positioning board comprises a threaded hole formed therein, the second side board that is mounted to the positioning board comprising a first apertures corresponding to the threaded hole, a second bolt being received from an outside of the second side board through the first aperture to be fixed to the threaded hole, so as to fixedly connect the second side board to the positioning board;
  wherein the mold frame comprises a support section and a plurality of mounting sections perpendicularly connected to the support section, the support section supporting the liquid crystal display panel, the mounting sections comprising a second hole corresponding to the threaded hole; and
  wherein the backlight module comprises a light guide plate mounted in the backplane, a reflector plate mounted between the light guide plate and the backplane, an optic film assembly mounted above the light guide plate, and a backlight source mounted to the backplane, the light guide plate being arranged on the bottom board, the reflector plate being arranged between the light guide plate and the bottom board, the backlight source being mounted to the first side boards.

10. A structure of a liquid crystal module, comprising: a backlight module, a mold frame mounted on the backlight module, a liquid crystal display panel mounted on the mold frame, an adaptor mounted to the backlight module, and a bezel mounted on the adaptor, the adaptor comprising a connection board and a positioning board perpendicularly connected to the connection board, the connection board being mounted to the backlight module, the liquid crystal display panel being positioned against the positioning board, the bezel being fixedly connected to the positioning board;
  wherein the bezel comprises a bezel body and a plurality of second side boards perpendicularly connected to the bezel body, at least one of the second side boards being arranged to correspond to the positioning board, the bezel being connected via the second side board to the positioning board; and
  wherein the positioning board comprises a threaded hole formed therein, the second side board that is mounted to the positioning board comprising a first apertures corresponding to the threaded hole, a second bolt being received from an outside of the second side board through the first a aperture to be fixed to the threaded hole, so as to fixedly connect the second side board to the positioning board.

11. The structure of the liquid crystal module as claimed in claim 10, wherein the mold frame comprises a support section and a plurality of mounting sections perpendicularly connected to the support section, the support section supporting the liquid crystal display panel, the mounting sections comprising a second hole corresponding to the threaded hole.

12. The structure of the liquid crystal module as claimed in claim 10 wherein the positioning board comprises a cushion at a location corresponding to the liquid crystal display panel, the liquid crystal display panel being positioned against the cushion.

13. The structure of the liquid crystal module as claimed in claim 12, wherein the cushion comprises a rubber material, a silicone rubber material or a foamed material.

14. The structure of the liquid crystal module as claimed in claim 10, wherein a plurality of reinforcement ribs is provided at connection between the connection board and the positioning board, the connection board, the positioning board, and the reinforcement ribs being integrally formed together with galvanized steel plate.

15. The structure of the liquid crystal module as claimed in claim 10, wherein the backlight module comprises a backplane, the backplane comprising a bottom board and a plurality of first side boards perpendicularly connected to the bottom board.

16. The structure of the liquid crystal module as claimed in claim 15, wherein the connection board is mounted to the bottom board.

17. The structure of the liquid crystal module as claimed in claim 16, wherein the connection board comprises a plurality of elongated positioning holes and a plurality of elongated locking holes, the bottom board comprising cylindrical positioning pegs corresponding to the elongated positioning holes and circular locking holes corresponding to the elongated. locking holes, first bolts being received from underside of the connection board through the elongated locking holes to engage and be fixed in the circular locking holes so as to connect the connection board and the bottom board.

* * * * *